March 24, 1953 A. C. FIELDS 2,632,522
ELECTROSTATIC PRECIPITATOR
Filed Oct. 28, 1950
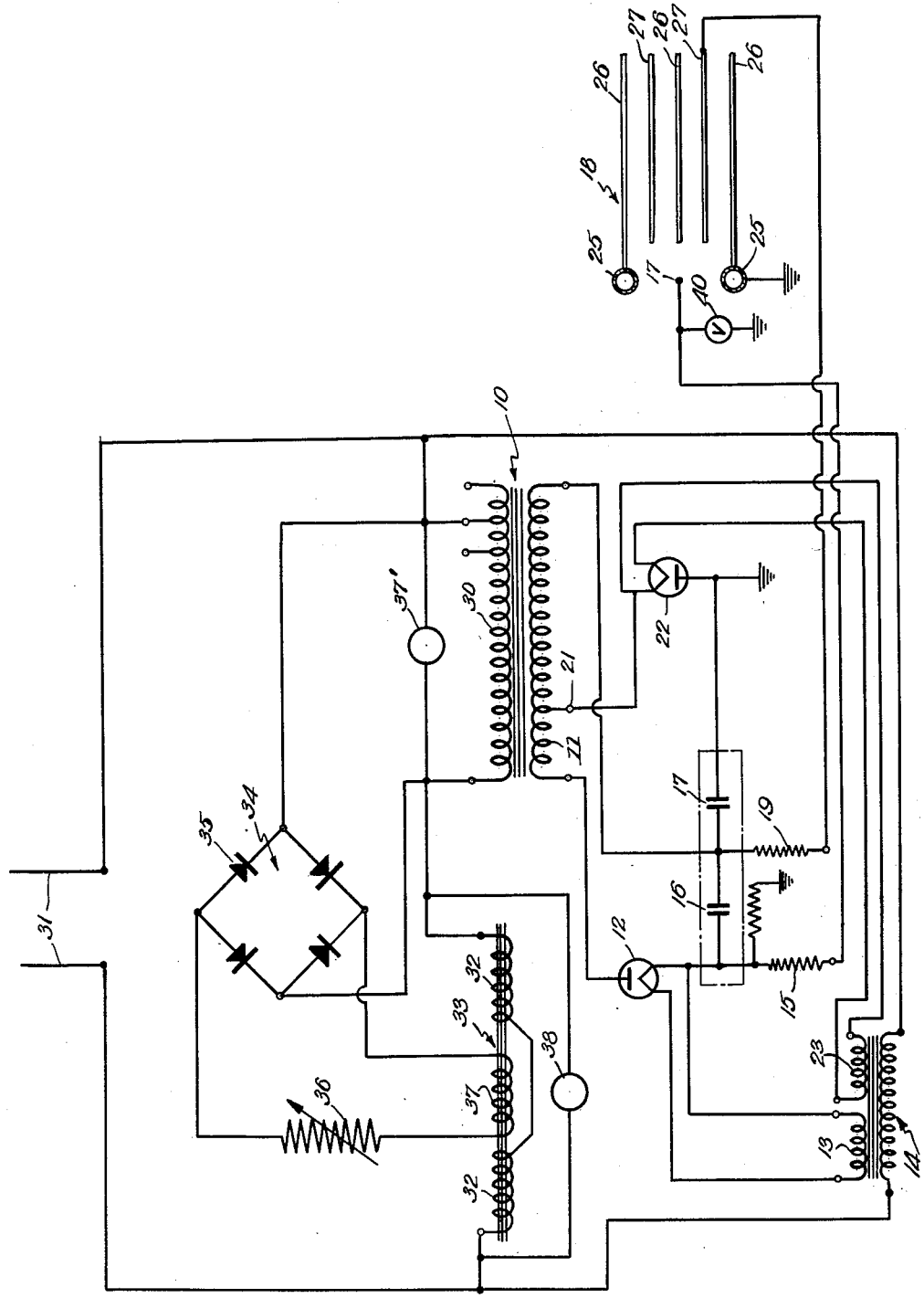
INVENTOR
Arnold C. Fields
BY Robert J. Palmer
ATT'Y.

Patented Mar. 24, 1953

2,632,522

UNITED STATES PATENT OFFICE 2,632,522

ELECTROSTATIC PRECIPITATOR

Arnold C. Fields, Medfield, Mass., assignor to Westinghouse Electric Corporation, East Pittsburgh, Pa., a corporation of Pennsylvania Application October 28, 1950, Serial No. 192,791

2 Claims. (Cl. 183—7)

This invention relates to electrostatic precipitators for removing small particles such as dust, from gases such as air, and relates more particularly to high voltage, direct current supplies for such precipitators.

The type of electrostatic precipitator most commonly used for removing dust from air, has an ionizer chamber containing ionizer wires and associated non-discharging ionizer electrodes in which the dust particles are given electrostatic charges, and has a collector chamber containing spaced collector plates alternate of which are grounded and the others of which are electrically charged. The ionizer wires have a potential of about 13,000 volts and the charged plates have a potential of about 6,000 volts.

Arc-overs between adjacent charged and grounded plates of such a precipitator occur at times as when fibres, hairs or other such matter pass between the plates. These amount to short-circuits which the power supply must be protected against without the use of such protective devices as fuses and circuit breakers requiring an operator's attention. Self-protecting power supplies, usually of the type having step-up transformers with high reactance primary circuits have been used. These have been successful in preventing the power supplies from being damaged by short circuits, but their voltage regulation at normal loads has not been entirely satisfactory.

This invention provides a high voltage, direct current power supply for an electrostatic precipitator which has an essentially flat voltage regulation characteristic throughout its normal load range, and which has a sharply dropping voltage characteristic when the load current exceeds normal.

In one embodiment of the invention, a saturable core reactor has its alternating current winding connected in series with one of the input wires to the primary winding of a single-phase step-up transformer, the secondary winding of which is connected through a rectifier, to the electrodes of an electrostatic precipitator. The direct current winding of the reactor is supplied with direct current from a rectifier which is energized by the regulated alternating current at the output of the reactor. When an overload on the power supply causes a voltage drop across the reactor, the reduction in voltage at the output of the reactor causes a reduction in the output voltage of the transformer while simultaneously the reduction in voltage into the rectifier, reduces the direct current in the reactor and hence increases the voltage drop across it, thus amplifying the regulating action and providing a sharp voltage reduction when overload occurs.

Another feature of the invention is that a short-circuit indicating lamp is connected across the alternating current winding of the saturable reactor so as to glow when an abnormal load occurs.

Another feature of the invention is that a normal load indicating lamp is connected across the primary winding of the power transformer so as to glow when normal loads occur.

Another feature of the invention is that a variable resistor is connected in series with the direct current winding of the saturable reactor and the rectifier therefor, and which is adjustable for varying the output voltage of the power supply.

An object of the invention is to provide a high voltage, direct current supply for an electrostatic precipitator which will provide a uniform voltage throughout its normal load range, and which will provide a sharply reduced voltage when overloaded.

The invention will now be described with reference to the drawing which is a circuit schematic of one embodiment of the invention.

The step-up transformer 10 has its secondary winding 11 connected at one end to the anode of the rectifier tube 12, the filament of which is connected to the secondary winding 13 of the filament transformer 14, to one end of the resistor 15, and to one of the series connected capacitors 16 and 17. The other end of the resistor 15 is connected to the ionizer wires 17 of the electrostatic precipitator 18 supplying about +6,000 volts thereto.

A tap 21 on the winding 11 is connected to the filament of the rectifier tube 22, the anode of which is grounded and connected to the capacitor 17. The filament of the tube 22 is also connected to the secondary winding 23 of the filament transformer 14.

The circuit described so far is a conventional voltage doubling circuit, one capacitor being charged during each half-cycle, and each delivering voltage in series with that from one of the tubes.

The electrostatic precipitator is a conventional one having the ionizer wire 17 between the grounded ionizer tubes 25, and having the grounded collector plates 26 between which are arranged the high potential collector plates 27. Such plates are usually spaced $\frac{5}{16}$" apart and occasionally a relatively large article such as a thread, fibre or even a bug, passes between adjacent plates causing an arc-over, this action becoming more frequent as the plates become loaded with dust, so that their effective spacing is decreased. It is desirable to have the direct current output voltage of the power supply drop sharply when such arc-overs occur, for preventing short-circuit damage. However, such voltage regulation should not cause the direct current output voltage to decrease materially during normal load increases, since the ionization current for effective electrostatic charging of the dust particles should remain substantially constant and this requires substantially constant direct current voltage to the wires. The voltage regulating circuit now to be described, provides the desired characteristics of a sharp reduction in voltage on overload, and a substantially constant voltage during normal loads.

The primary winding 30 of the transformer 10 has one side connected directly to one of the single-phase, electric mains 31 and has its other side connected through the alternating winding 32 of the saturable reactor 33, to the other of the mains. The winding 30 is also connected at its ends across the bridge rectifier 34 consisting of four selenium rectifiers 35. The direct current output of the rectifier is connected through the variable resistor 36 to the direct current winding 37 of the reactor 33.

The overload indicator lamp 38 is connected across the winding 32 of the reactor.

The normal operation indicator lamp is connected across the transformer primary winding 30.

In operation, an increased load on the transformer 10 causes an increased voltage drop across the alternating current winding 32 of the saturable reactor. This results in reduced output voltage from the transformer, and in decreased alternating current voltage at the rectifier 34. This, in turn, results in decreased direct current voltage from the rectifier 34 to the direct current winding 37 of the saturable reactor. This, in turn, causes an increase in the reactance of the winding 32 and in a further reduction in the voltage across the primary winding of the transformer 10 and in a resulting reduction in the direct current voltage from the secondary circuit. This action is accumulative and results in a sharp voltage reduction at overload.

In the normal load range the direct current voltage is constant. At the overload point, however, the direct current voltage drops sharply. Thus, the desired uniform voltage for adequate ionization and collection is provided during the entire normal load range, while at overload the voltage drops so sharply to such a low voltage that an arc-over cannot damage the transformer or any of the rectifier components. This is highly desirable for electrostatic precipitators which must operate unattended, and in which the arc-overs usually burn up the material causing them. If fuses or circuit-breakers were used for overload protection, the fuses would have to be replaced and the circuit-breakers would have to be re-set, the precipitator remaining out of service until this was done.

During normal operation, the voltage drop across the transformer primary winding is relatively high so that the indicator lamp 37' will light. At this time the voltage drop across the saturable reactor winding 32 is relatively low so that the lamp 38 will not light. When an abnormal load occurs, the voltage across the winding transformer 30 will decrease and the lamp 37' will go out, while the voltage across the reactor winding 32 will increase and the lamp 38 will light. Thus the operating condition of the precipitator will be indicated by the two lamps.

It is desirable to be able to adjust the direct current voltage delivered to an electrostatic precipitator, especially to the ionizer wires thereof, since maximum ionization current without corona discharges is desired for the most efficient electrostatic charging of the dust particles. By adjustment of the variable resistor 36 and observation of the voltmeter 40 connected between the ionizer wire and ground, the voltage may be varied to that most effective for a particular operating condition.

Another advantage of this invention is that no vacuum tubes are required for energizing the D. C. winding of the saturable reactor.

Another advantage of this invention is that the voltage regulation components are in the low voltage, transformer primary circuit where insulation is less of a problem.

While one embodiment of the invention has been described for the purpose of illustration, it should be understood that the invention is not limited to the exact apparatus and arrangement of apparatus illustrated, since modifications thereof may be suggested by those skilled in the art without departure from the essence of the invention.

What I claim as my invention, is:

1. In combination with an electrostatic precipitator having spaced-apart electrodes, a power supply for applying a direct current difference in potential to said electrodes, said supply comprising a step-up transformer having a primary winding, and having a secondary winding, rectifying means connected to said secondary winding and to said electrodes, a saturable reactor having an alternating current winding connected in series with said primary winding, and having a direct current winding, a variable resistor, and a rectifier having its input terminals connected across said primary winding, and having its output terminals connected in series with said resistor across said direct current winding.

2. The invention claimed in claim 1 in which a normal load indicator lamp is connected across said primary winding, and an overload indicator lamp is connected across said direct current winding.

ARNOLD C. FIELDS.

REFERENCES CITED

The following references are of record in the file of this patent:

UNITED STATES PATENTS

| Number | Name | Date |
| --- | --- | --- |
| 2,217,481 | Hildebrand et al. | Oct. 8, 1940 |
| 2,297,740 | Brown | Oct. 6, 1942 |
| 2,310,786 | Hildebrand | Feb. 9, 1943 |
| 2,336,625 | Milton | Dec. 14, 1943 |
| 2,444,472 | Schooley | July 6, 1948 |
| 2,503,880 | Mah | Apr. 11, 1950 |